Figure 1:
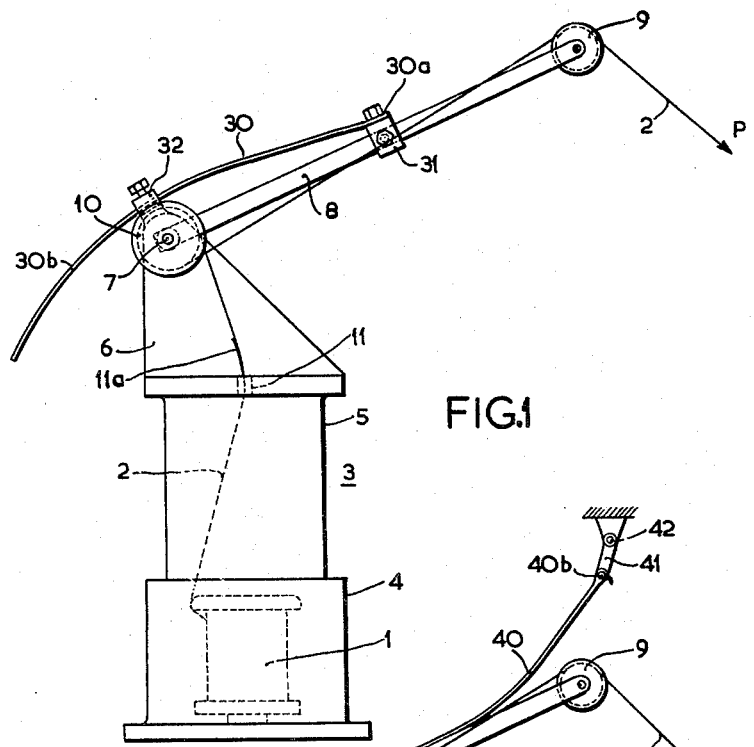

July 18, 1961 W. VAN DER HOEK 2,992,792
WIRE-UNWINDING DEVICE SUITED MORE PARTICULARLY
FOR USE WITH COIL-WINDING MACHINES
Filed April 19, 1957 2 Sheets-Sheet 2
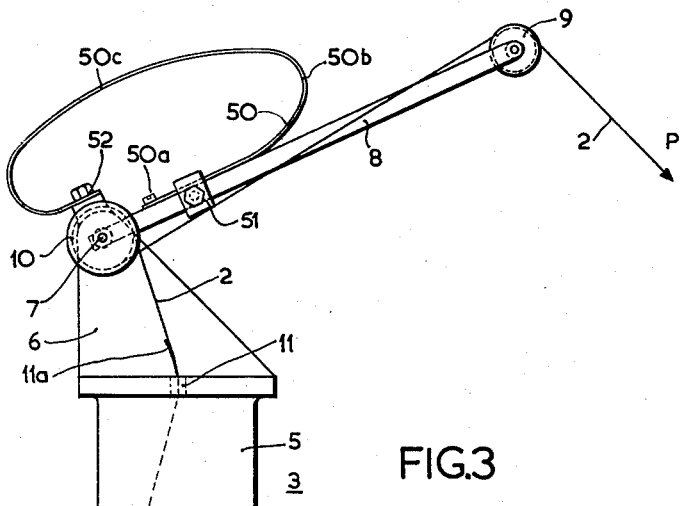
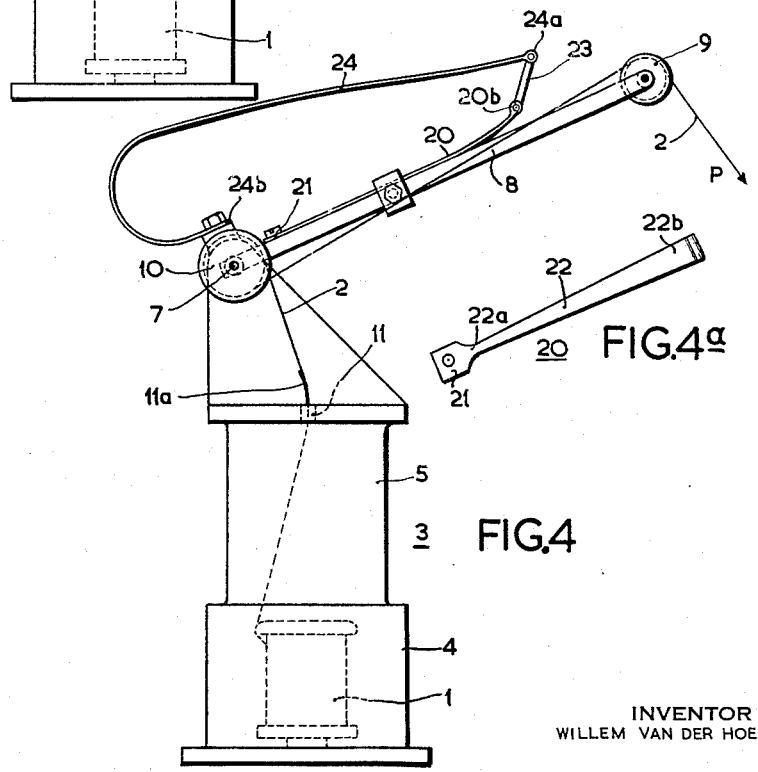
INVENTOR
WILLEM VAN DER HOEK
BY
AGENT United States Patent Office 2,992,792
Patented July 18, 1961

2,992,792
WIRE-UNWINDING DEVICE SUITED MORE PARTICULARLY FOR USE WITH COIL-WINDING MACHINES
Willem van der Hoek, Eindhoven, Netherlands, assignor to North American Philips Company, Inc., New York, N.Y., a corporation of Delaware
Filed Apr. 19, 1957, Ser. No. 653,811
Claims priority, application Netherlands May 29, 1956
8 Claims. (Cl. 242—128)

It is known in wire-unwinding devices such as used in coil winding machines to provide the pivotal arm carrying at least one wire-unwinding wheel with an adjustable spring. The function of such a spring is to pull said arm upwards against the tension in the unwinding wire material and thus to maintain this tension. The spring is usually made adjustable to permit wire material of relatively different thickness and hence strength to be handled by the wire-unwinding device concerned. It is common practice in such unwinding devices to utilize a helical spring, of which the spring tension or the point of application on the arm is variable.

The object of the present invention is to provide a wire-unwinding device of extremely simple construction which can easily be operated and adjusted. The wire-unwinding device according to the invention is characterized in that said spring is only subject to bending stress during the operation of the device, while means are provided by which the point of application of the spring on the arm may be displaced and the length of the portion of the spring acting upon the arm may be varied. Thus, a twofold possibility of adjustment exists. The displacement of the point of application of the spring on the arm results in variation in the torque exerted upon the arm by the spring as a result of a variation in the lever arm. Besides, variation in this torque may alternatively be obtained by varying the force exerted upon the point of application as a result of variation in the active length of the spring.

In one embodiment of the invention, the active length of the spring is increased, and conversely, when the point of application of the spring on the arm is displaced towards the pivot of the arm. This embodiment is advantageous more particularly on account of its very great possibility of adjustment of the wire tension and its comparatively low load on the bearing. Furthermore, the advantage is obtained that the portion of the spring to be accelerated during the movements of the arm is smaller as the wire tension adjusted is smaller. The above-mentioned twofold possibility of adjustment of the device according to the invention has a supplementing effect that, for example, upon reduction of the torque exerted upon the arm as a result of a reduction of the lever arm, the force then acting upon the arm is also automatically decreased, since upon reduction of the arm the active length of the spring has become larger and the spring thus comparatively weaker.

In another embodiment of the invention, this effect may be even intensified by giving the spring in its longitudinal direction a rigidity decreasing gradually or in steps, in such manner that upon adjustment of the spring to a larger length of its active portion, less rigid portions of the spring become active.

In order that, more particularly, if that extremity of the spring extending substantially in the direction of length of the arm, which is remote from the pivot of the arm, lies comparatively close to the free extremity of the arm, the necessity may be avoided for said extremity, during the movements of the arm, to perform such angular displacements as are unfavourable for the material of the spring, it is preferably in another embodiment of the invention that said extremity should be spatially supported so as to be freely pivotal at least within given limits.

Although this may be achieved by means of a fixed pivot suitable for the purpose, it is frequently simpler from a structural viewpoint to support said extremity itself also in a resilient manner. The last-mentioned embodiment affords the additional advantage that the element supporting the extremity of the spring in a freely pivotal and resilient manner within the determined limits, is capable of readily taking up the energy released in case of rupture of the wire.

To enable the free end of the arm to perform a comparatively large stroke, in another embodiment of the wire-unwinding device according to the invention, the spring acting upon the arm is for this purpose lengthened itself, so that its extremity may be secured to a spatially fixed point. As a rule, it is preferable, however, that the extremity of the spring remote from the pivot of the arm should be coupled with a separate further spring, likewise subject only to bending stress, of which the end remote from this coupling area is secured to a spatially fixed point, preferably to the wire-unwinding device itself, since in the latter case said further spring may be given properties greatly differing from the first-mentioned spring, which may be effected more easily than if only the first-mentioned possibilities of rigidity variation of the first spring are available.

Figure 2:
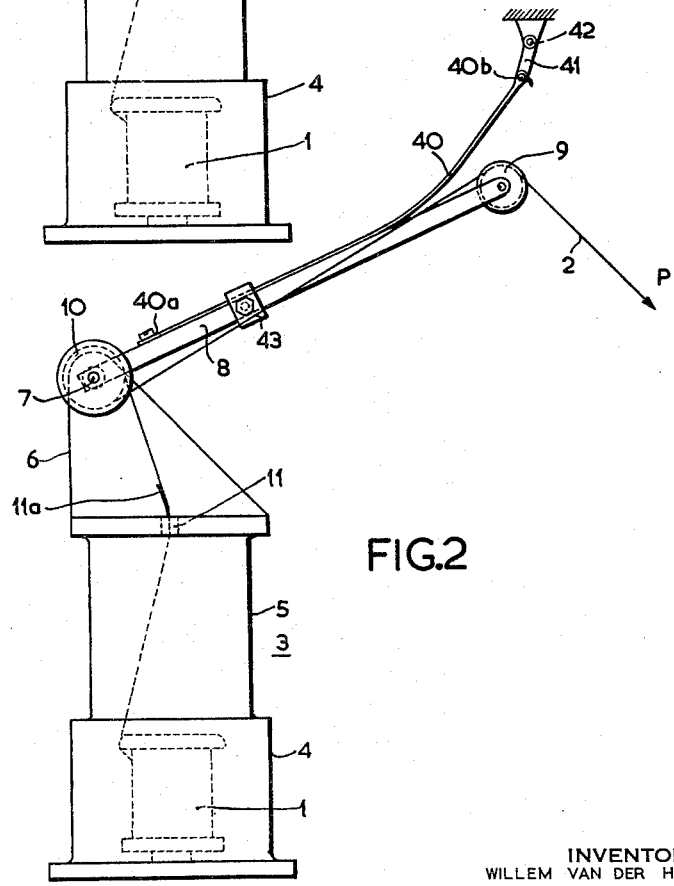

In order that the invention may be readily carried into effect, four different embodiments of the wire-unwinding device according thereto will now be described, by way of example, with reference to the accompanying drawings, FIG. 1 is a side elevation view of a wire de-reeling device constructed in accordance with the present invention, FIG. 2 is a modification thereof, FIG. 3 is another modification thereof, FIG. 4 is a further modification thereof, FIG. 4a is a plan view of a portion of FIG. 4.

The differences substantially consist in relatively different structures of the springs utilized and in different supports for this spring on the arm and in space. FIG. 4a shows a plan view of the spring used in FIG. 4.

In the drawing, the invention is applied to a wire-unwinding device for a delivery reel 1, which is to be unwound endwise and of which the wire material 2 is to be wound on a coil at an area in space (not shown). The wire-unwinding device comprises a housing 3 having a base 4 which contains means for the arrangement of delivery reel 1. The housing also contains a wire guide 5, in this example of cylindrical shape, which is provided at its upper side with a flat frame plate 6 having a pivot at 7. About this pivot can swing an arm 8, the end of which carries an unwinding wheel 9. Furthermore, a guide wheel 10 can rotate about the point 7, which guide wheel may be combined, if desired, with a wire braking device (not shown). The wire material 2 freely unwinds off the delivery reel 1, if a force P is exerted thereupon, for example due to the winding of a coil. The wire is then led through the wire guide 5 and reaches via a wire stretcher 11 in the form of a small felt block and along a curved, likewise felt-covered guide 11a, the surface of a guide wheel 10a. The wire material is wound with some turns around the surface of this guide wheel and subsequently led via unwinding wheel 9 to the coil to be wound (not shown). The devices shown in FIGS. 1 to 4 are insofar identical.

The spring acting upon the arm in the device according to the invention is only subject to bending stress during operation. For this purpose, use may be made of springs of any kind, such as plate springs and wire springs, which are subject only to bending stress. It will be evident that, as an alternative, the spring may be composed of several plate or wire springs. It is possible, for example, to superpose several plate springs or juxtapose several wire springs. The wire material may have a circular or rectangular cross-section.

As previously mentioned, it is preferable in determined embodiments of the device according to the invention to utilize a spring which, in the direction of its length, has a rigidity decreasing gradually or in steps. As a rule, this may be achieved by utilizing a spring having a dimension varying in width. One embodiment thereof is shown in FIG. 4a, in which the spring 20 used in FIG. 4 is shown in plan view. The spring 20 has a portion, with which it is fixed on the arm 8, for example by means of one or more bolts, and also a portion 22, having a width which gradually increases from the end 22a towards the end 22b. It will be evident that the left-hand portion of the spring is considerably weaker than its right-hand portion.

With regard to the constructions shown in FIGS. 1 to 4, the following remarks may be made.

In the construction shown in FIG. 1, use is made of a plate spring 30, of which one end 30a is rigidly secured to a rider 31, which can slide over the arm 8 and be fixed thereon at different distances from the pivot 7 of the arm 8. The free end 30b of this spring can slide along a guide 32 provided on the wire-unwinding device and be secured therein. It may be seen from FIG. 1 that the length of spring 30 acting upon the arm 8 is determined by the distance between the guide 32 and the position of the rider 31 on the arm 8. The angular position of the arm 8, apart from the weight of the arm 8 and the further movable parts, is determined at any moment by the torques counteracting one another upon this arm. One torque thereof is exerted by a force P originating from the unwinding wire material. The other is exerted by the force with which the spring 30 endeavours to pull the arm 8 upwards.

The embodiment shown in FIG. 2 differs from that shown in FIG. 1 in so far that the spring 40 is rigidly secured to the arm 8 at its end 40a. The end 40b of this spring is suspended by means of a rocking piece 41 from a spatially fixed pivot 42. A rider 43 can slide along the arm 8 and has not only a passage for the arm 8, but also a passage for the spring 40, so that the area of the point of application of spring 40 on the arm 8 is determined as a function of the position of the rider 43 on the arm 8. The portion of the spring 40 situated in the drawing to the left of the rider is thus invariably inactive, the active length of the spring being determined by the distance between the rider 43 and the pivot 40b of spring 40. The active length of the spring 40 thus becomes greater and the spring weaker, according as the rider 43 occupies a more left-handed position. Consequently, when the rider 43 lies more to the left on the arm 8, the force exerted upon the arm by this spring is smaller. In this embodiment, a displacement of the rider along the arm 8 thus brings about not only a variation of the lever arm, resulting from the torque exerted upon the arm due to the presence of the spring, but also, in contradistinction with the embodiment of FIG. 1, automatically varies in the same sense the force corresponding to this torque. The wire-unwinding device shown in FIG. 2 thus permits, similarly as in the embodiments of FIGS. 3 and 4, which will be described hereinafter, the use of this device for unwinding wire of greatly differing thickness and strength.

The presence of the rocking piece 41 and the pivot 42 ensures, even when the rider 43 has been moved wholly to the right, a sufficient possibility of angular displacement of the portion of the spring 40 adjacent this suspension device. There is thus no risk of excessive bending stress of the spring material in this region.

In the embodiment shown in FIG. 3, similarly as is the case in FIG. 2, the spring is secured, at its left-hand end 50a, to the arm 8 at an area thereof which is adjacent the pivot 7 of the arm 8. In this case also, a rider 51 can slide along the spring 50 and the arm 8 and may be fixed at any desired position. However, in contradistinction with FIG. 2, in this embodiment, the end 50b of the spring 50, which is remote from the pivot 7, is bent over and the same spring 50 extends as a portion 50c back to a securing area 52 provided on the unwinding device proper. The portion 50b is thus spatially supported in a resilient and freely pivotal manner. Consequently, in this case also it is ensured that, when the rider 41 has been moved fully to the right, the portion 50b is not subject to unduly high bending stress. The embodiments shown in FIGS. 3 and 4 moreover have the advantage with respect to that of FIG. 2, that the arm 8 can perform a large stroke at any position of the rider. Besides, with the first-mentioned embodiments, the advantage is obtained that energy released in case of rupture of the wire is readily taken up and braked by the spring portion 50c (FIG. 3) and 24 (FIG. 4).

The embodiment shown in FIG. 4 is fundamentally identical with that shown in FIG. 3, but structurally differs therefrom in so far that the aforementioned spring 20 is connected at its end 22b, to a rocking piece 23, the end 24a of which is secured to a further plate spring 24, the other end 24b of which is fixed to the wire-unwinding device. This embodiment affords the advantage that there is freedom to utilize for a portion of the plate spring 24 a rigidity factor quite different from that of the plate spring 20. In the case shown, for example, the spring 20 may comprise two superposed elements with a plan view as shown in FIG. 4a, while the spring 24 may comprise a single spring plate of a thickness greater than that of the two other plates.

What is claimed is:

1. A wire-unwinding device adapted for use in a coil-winding machine comprising a base member supporting a wire-guide, an arm pivotally secured at one end to said wire-guide and carrying at least one wire unwinding wheel, and a resilient member subject only to bending stress fixedly positioned at both ends, and means slideable along the arm and the resilient member for varying the effective length of the latter to thereby vary the tension of the resilient member acting on said arm.

2. A wire-unwinding device adapted for use in a coil-winding machine comprising a base member supporting a wire guide, an arm carrying at least one wire-unwinding wheel, means to pivotally secure one end of said arm to said guide, and a resilient member subject only to bending stress connected at one end to a fixed support and rigidly secured at its other end to the arm, and means intermediate the ends of the resilient member slideable along the resilient member and the arm for varying the effective length and tension of the resilient member acting upon the arm.

3. A wire-unwinding device adapted for use in a coil-winding machine comprising a base member supporting a wire guide, an arm carrying at least one wire-unwinding wheel, means to pivotally connect one end of said arm to the wire guide, and a resilient member secured to a fixed support at one end remote from the wire-guide and secured to a fixed member connected to the arm at its other end, and means intermediate the ends of the resilient member slideable therealong and along the arm for varying the effective length and tension of the resilient member acting upon the arm.

4. A wire-unwinding device adapted for use in a coil-winding machine comprising a base member supporting a wire-guide, an arm carrying at least one wire-unwinding wheel, and a resilient member subject only to bending stress flexibly connected at one end to a fixed mounting member remote from the wire guide and connected at its other end to a member fixedly secured to said arm adjacent to said wire guide, and means intermediate the ends of said resilient member slideable therealong and along the arm for varying the effective length and tension of the resilient member acting on the arm.

5. A wire-unwinding device adapted for use in a coil-winding machine comprising a base member supporting a wire-guide, an arm pivotally secured at one end to said wire guide and carrying at least one wire-unwinding wheel, a resilient member subject to bending stress secured at one end and coupled to said arm at the other end, and means slideable along the arm for varying the effective length of said resilient member to vary the tension of the resilient member on the arm.

6. A wire-unwinding device as claimed in claim 5 in which the resilient member is secured at one end to the means slideable along the arm and at the other end to the wire-guide.

7. A wire-unwinding device as claimed in claim 5 in which the resilient member is secured at one end to the arm and at the other end to the wire guide.

8. A wire-unwinding device as claimed in claim 7 in which the resilient member comprises two portions connected together between the wire guide and the means slideable along the arm by a flexible member.

References Cited in the file of this patent

UNITED STATES PATENTS

| | | |
|---|---|---|
| 974,365 | Draper | Nov. 1, 1910 |

FOREIGN PATENTS

| | | |
|---|---|---|
| 365,980 | Great Britain | Jan. 28, 1932 |